US012584470B2

(12) United States Patent　　　　(10) Patent No.:　US 12,584,470 B2
Enevoldsen et al.　　　　　　　　　(45) Date of Patent:　　Mar. 24, 2026

(54) METHOD FOR PRODUCING A WATER-HYDRAULIC MACHINE

(71) Applicant: Danfoss A/S, Nordborg (DK)

(72) Inventors: Georg Enevoldsen, Nordborg (DK); Stig Kildegaard Andersen, Krusaa (DK); Frank Holm Iversen, Padborg (DK)

(73) Assignee: DANFOSS A/S, Nordborg (DK)

( * ) Notice: Subject to any disclaimer, the term of this patent is extended or adjusted under 35 U.S.C. 154(b) by 1342 days.

(21) Appl. No.: 17/030,497

(22) Filed: Sep. 24, 2020

(65) Prior Publication Data

US 2021/0088037 A1　　　Mar. 25, 2021

(30) Foreign Application Priority Data

Sep. 25, 2019　　(DE) ......................... 102019125839.1

(51) Int. Cl.
　F04B 27/08　　　(2006.01)
　B23P 15/00　　　(2006.01)
(52) U.S. Cl.
　CPC ............ F04B 27/086 (2013.01); B23P 15/00 (2013.01); F05C 2201/046 (2013.01);
　　　　　　　(Continued)
(58) Field of Classification Search
　CPC ........................... B23P 15/00; Y10T 29/49236
　See application file for complete search history.

(56) References Cited

U.S. PATENT DOCUMENTS 5,700,546 A　*　12/1997　Fujii .................... F16J 15/3496
　　　　　　　　　　　　　　　　　　384/492
5,961,218 A　　10/1999　Nagasaka et al.
　　　　　　(Continued)

FOREIGN PATENT DOCUMENTS

CN　　　203081669 U　　7/2013
CN　　　103615385 A　　3/2014
　　　　　　(Continued)

OTHER PUBLICATIONS

First Examination Report for Indian Patent Application No. 202014033961 dated Jun. 29, 2021.
　　　　　　(Continued)

*Primary Examiner* — Sarang Afzali
(74) *Attorney, Agent, or Firm* — McCormick, Paulding & Huber PLLC

(57)　　　　　ABSTRACT

A method for producing a water-hydraulic machine having a first member (1) and a second member (2) in sliding contact with a contact surface (3) of the first member (1), wherein the second member (2) comprises a surface made of a friction reducing plastic material and the contact surface (3) is a metallic surface, is disclosed. The machine should have a low risk of damages. To this end, the method includes the steps of using a first member (1) comprising a first part (4) having the contact surface (3) and a second part (5), using a high temperature hardening process at a temperature of at least 1000° C. to give a deep surface hardening of the contact surface (3) of the first part (4), machining of the first part (4) to the desired geometry, assembling the first part (4) and the second part (5) to form the first member.

20 Claims, 1 Drawing Sheet

(52) U.S. Cl.
CPC ...... *F05C 2251/10* (2013.01); *F05C 2253/24*
(2013.01); *Y10T 29/49236* (2015.01)

(56) References Cited

U.S. PATENT DOCUMENTS

| | | | | |
|---|---|---|---|---|
| 8,277,653 B2 * | 10/2012 | Shinoda | ................. | B01D 61/06 |
| | | | | 417/313 |
| 2010/0116377 A1 * | 5/2010 | Collins | .................... | C23C 8/22 |
| | | | | 148/225 |
| 2014/0050932 A1 | 2/2014 | Gierl et al. | | |
| 2018/0154449 A1 | 6/2018 | Mueller et al. | | |
| 2018/0236553 A1 | 8/2018 | Ito et al. | | |

FOREIGN PATENT DOCUMENTS

| | | | |
|---|---|---|---|
| CN | 104246001 | A | 12/2014 |
| CN | 107923027 | A | 4/2018 |
| DE | 19510302 | C2 | 4/1997 |
| EP | 0 852 294 | A2 | 7/1998 |
| EP | 1 262 661 | A1 | 12/2002 |
| EP | 2841617 | B1 | 12/2017 |

OTHER PUBLICATIONS

Search Report for Great Britain Patent Application No. GB2014975.3
dated Feb. 3, 2021.

* cited by examiner

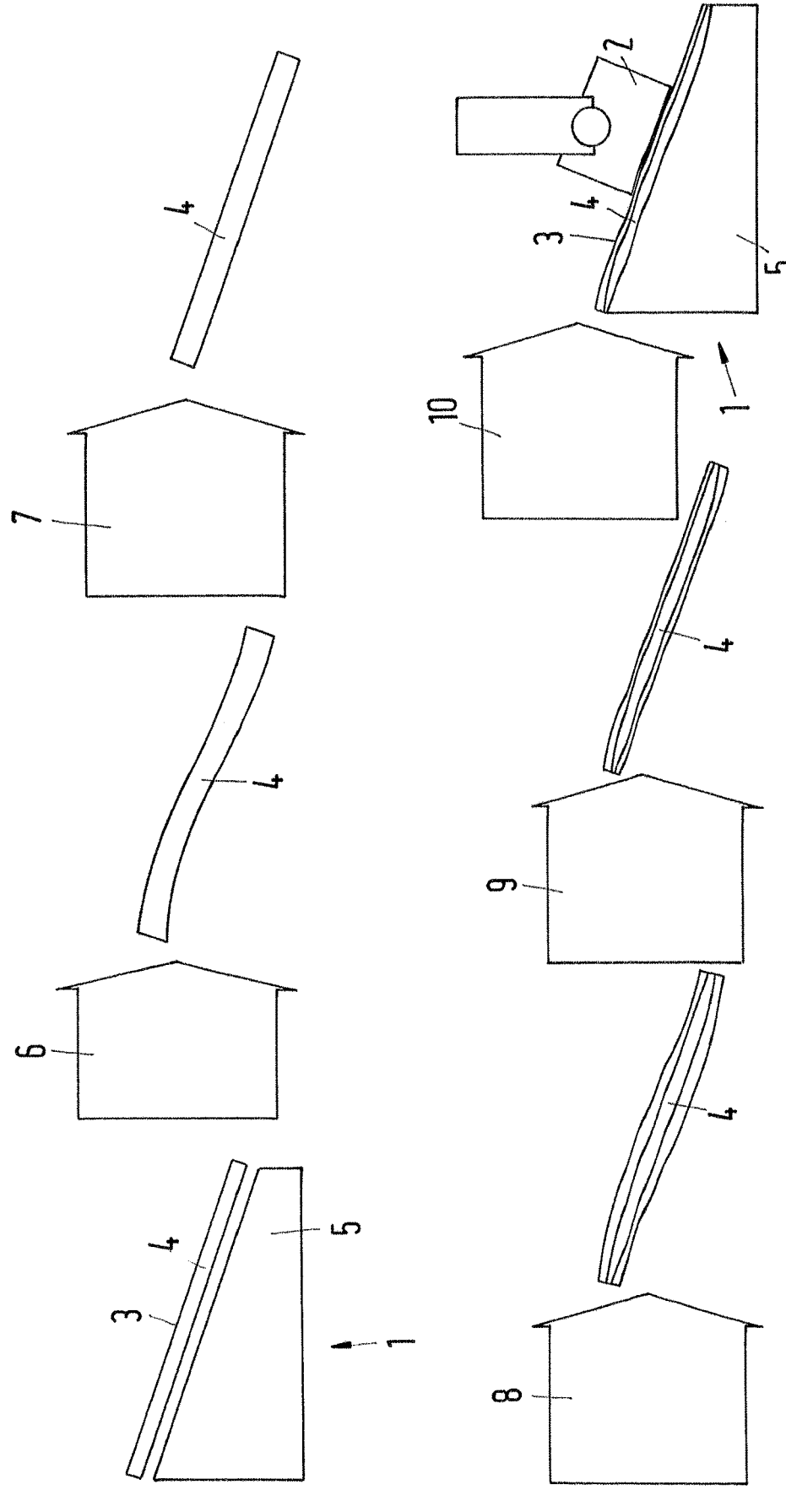

METHOD FOR PRODUCING A WATER-HYDRAULIC MACHINE

CROSS-REFERENCE TO RELATED APPLICATION

This application claims foreign priority benefits under 35 U.S.C. § 119 to German Patent Application No. 102019125839.1 filed on Sep. 25, 2019, the content of which is hereby incorporated by reference in its entirety.

TECHNICAL FIELD

The present invention relates to a method for producing a water-hydraulic machine having a first member and a second member in sliding contact with a contact surface of the first member, wherein the second member comprises a surface made of friction reducing plastic material and the contact surface is a metallic surface.

BACKGROUND

A water-hydraulic machine uses water as hydraulic fluid. Water has the advantage that it is environment friendly. Water has, however, the disadvantage that it does not lubricate surfaces sliding relative to each other. It is therefore known to use a friction reducing plastic material in one of the contact surfaces. Such a friction reducing plastic material can be, for example, Polyetheretherketon (PEEK). However, when such a plastic surface is exposed to particle above a certain critical side, typically sand or silica, large pieces are ripped out from the metal surface which then embeds partially in the plastic material. The protruding part of the partially embedded metal pieces then starts to wear and scratch against the metal contact surface. This may lead to increasing internal leak rates and reduction of the volumetric efficiency, increased wear of the metallic contact surface reducing the service life and an increased friction leading to reduced mechanical efficiencies.

SUMMARY

The object underlying the invention is to produce a machine having a low risk of damage.

This object is solved with a method as described at the outset in that the method comprises the steps of using a first member comprising a first part having the contact surface and a second part, using a high temperature hardening process at a temperature of at least 1000° C. to give a deep surface hardening of the contact surface of the first part, machining of the first part to the desired geometry, assembling the first part and the second part to form the first member.

The use of a high temperature hardening process gives a relatively hard contact surface to withstand damages caused by particles having a certain critical size. However, the use of a high temperature hardening process has the disadvantage that the hardened part is distorted which is detrimental for any hydraulic machine. This drawback is overcome by machining the first part to the desired geometry and assembling the first part and the second part to form the first member. The first member then has a contact surface of a considerable hardness and the desired geometry.

In an embodiment of the invention the high temperature hardening process is carried out in the presence of nitrogen. This offers the possibility that nitrogen diffuses into the contact surface up to a depth of 1 to 2 mm and the surface has a hardness of up to 400 HV (Vickers hardness). The machining reduces the thickness of the hardened layer. However, the remainder of the first member is still hard to withstand to a high degree damages caused by sand or silica particles.

In an embodiment of the invention a low temperature hardening process at a temperature of 550° C. or lower is used to give a final super hard contact surface of the first part. If, due to the machining of the first part, the contact surface has lost the desired hardness or desired hardness is reduced below a predetermined threshold value, the low temperature hardening process can be used to give a final super hard surface, for example, 1000 HV or more and a surface layer of approximately 100 μm. This is sufficient for a water-hydraulic machine.

In an embodiment of the invention the contact surface is polished. A polishing is used to achieve the required flatness tolerances.

In an embodiment of the invention the first part is chosen to have a smaller thickness than the second part. The smaller the thickness is the smaller is the risk of distortion of the second part.

In an embodiment of the invention the thickness of the first part is equal to or smaller than 10 mm. This thickness is sufficient to form the first part. However, the risk of distortion can be handled.

In an embodiment of the invention the first part is chosen to be symmetric with respect to an axis located in the contact surface. When the first part is a symmetric part, the distortion can be kept small.

In an embodiment of the invention the first part is chosen to be symmetric with respect to a second axis located in the contact surface and being orthogonal to a first axis. Again, the symmetry reduces the distortion.

In an embodiment of the invention the first part is chosen to be of stainless steel. Stainless steel is preferred when water is used as hydraulic fluid.

In an embodiment of the invention the first part is chosen to be duplex steel or super duplex steel or 316 steel. Even the 316 steel can be used because it is hardened by the method.

BRIEF DESCRIPTION OF THE DRAWINGS

The invention will now be described in more detail with reference to the drawing, which show:

Only FIGURE: A schematic flow diagram of the method.

DETAILED DESCRIPTION

The FIGURE shows schematically members of a water-hydraulic machine, more precisely a first member 1 in form of a swash plate and a second member 2 in form of a slide shoe. The invention can, however, be used in connection with another pairing of elements, for example cylinder drum and valve plate. The first member comprises a metallic contact surface 3. The second member 2 is in sliding contact with the contact surface 3. In order to be able to use water as hydraulic fluid, the second member 2 is provided with a coating of a friction reducing plastic material, for example Polyetheretherketon (PEEK) at least at the side facing the contact surface 3.

In order to keep the risk of damages of the contact surface 3 low, it is desired to make the contact surface 3 as hard as possible.

To this end, the first member 1 is designed to have two parts, namely a first part 4 having the contact surface 3 and a second part 5.

The first part 4 is symmetric at least with respect to a first axis of symmetry located in the contact surface. However, it is preferred that the first part 4 is symmetric with respect to a second axis of symmetry located in the contact surface as well and being orthogonal to the first axis of symmetry.

Furthermore, the first part 4 is chosen to have a smaller thickness than the second part 5. The thickness of the first part 4 is equal to or smaller than 10 mm.

Only the first part 4 is subjected to a hardening process at a temperature of at least 1000° C. and preferably in the presence of nitrogen. Such a hardening process is described in more detail in EP 2 841 617 B1. This process is abbreviated with "high temperature hardening process" 6.

During this high temperature hardening process 6 the first part 4 distorts. However, the distortion is small due to the symmetry.

In a machining step 7 the first part 4 is machined to the desired geometry. This means that some of the hardened surface layer of the first part 4 is removed.

In a following low temperature hardening process 8 the first part 4 is provided with a super-hard surface layer. The low temperature hardening is performed at a temperature in the range of 450° C. to 550° C. The super-hard surface layer has a thickness of approximately 100 μm and a hardness of 1000 HV (Vickers hardness) or more.

The low temperature hardening process 8 again leads to a distortion of the first part 4. However, this distortion is smaller than the distortion caused by the high temperature hardening process 6.

Following to the low temperature hardening process 8 the part 4 is polished in a polishing step 9. In the polishing step 9 part 4 is polished to required flatness tolerances. Due to the smaller distortions, polishing is sufficient to achieve the desired geometry.

After the polishing step 9 the first part 4 and the second part 5 are assembled, for example, by screws or glue. It is possible to use other assembly technics. Furthermore, in some cases it is not necessary to connect the two parts, e.g, when a pressure or a force produced by spring means acting on one of the two parts is sufficient to hold the two parts together. In this case it might be necessary to use something to align the two parts.

Achieved is a final product, i.e. the first member 1, having an exact geometry and a high surface hardness with a thickness of the hardened surface of approximately 50 μm.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A method for producing a water-hydraulic machine, the method comprising the steps of:
 providing a first part having a contact surface and a second part,
 using a high temperature hardening process at a temperature of at least 1000° C. to give a deep surface hardening of the contact surface of the first part,
 machining of the first part to a desired geometry,

assembling the first part and the second part to form a first member,
 providing a second member in sliding contact with the contact surface of the first member, thereby forming the water-hydraulic machine, wherein the second member comprises a surface made of a friction reducing plastic material and the contact surface is a metallic surface.

2. The method according to claim 1, wherein the high temperature hardening process is carried out in a presence of nitrogen.

3. The method according to claim 2, wherein a low temperature hardening process at a temperature of 550° C. or lower is used to give a final super hard contact surface of the first part.

4. The method according to claim 2, wherein at least the contact surface is polished.

5. The method according to claim 2, wherein the first part is chosen to have a smaller thickness than the second part.

6. The method according to claim 2, wherein the first part is chosen to be symmetric with respect to an axis located in the contact surface.

7. The method according to claim 1, wherein after the machining of the first part to the desired geometry, a low temperature hardening process at a temperature of 550° C. or lower is used to give a final super hard contact surface of the first part.

8. The method according to claim 7, wherein at least the contact surface is polished.

9. The method according to claim 7, wherein the first part is chosen to have a smaller thickness than the second part.

10. The method according to claim 7, wherein the first part is chosen to be symmetric with respect to an axis located in the contact surface.

11. The method according to claim 1, wherein at least the contact surface is polished.

12. The method according to claim 11, wherein the first part is chosen to have a smaller thickness than the second part.

13. The method according to claim 11, wherein the first part is chosen to be symmetric with respect to an axis located in the contact surface.

14. The method according to claim 1, wherein the first part is chosen to have a smaller thickness than the second part.

15. The method according to claim 14, wherein the thickness of the first part is equal to or smaller than 10 mm.

16. The method according to claim 1, wherein the first part is chosen to be symmetric with respect to an axis located in the contact surface.

17. The method according to claim 16, wherein the first part is chosen to be symmetric with respect to a second axis located in the contact surface and being orthogonal to the first axis.

18. The method according to claim 1, wherein the first part is chosen to be of stainless steel.

19. The method according to claim 18, wherein the first part is chosen to be duplex steel or super duplex steel or 316 steel.

20. The method according to claim 1, wherein the machining of the first part occurs after using the high temperature hardening process, and wherein the machining of the first part comprises removing some of the hardened contact surface.

* * * * *